United States Patent [19]

Volfkovich et al.

[11] 4,158,699
[45] Jun. 19, 1979

[54] INSTALLATION FOR THE PRODUCTION OF YELLOW PHOSPHORUS

[76] Inventors: Semen I. Volfkovich, Vystavochny pereulok, 3, kv. 12, Moscow; Vladimir N. Belov, Bolsheokhtinsky prospekt, 3, kv. 305; Vadim A. Ershov, prospekt Veteranov, 105, kv. 29, both of Leningrad; Evgeny K. Rozenberg, Novokhoroshevskoe shosse, 31, korpus 2, kv. 36; Emmanuil I. Shipov, Izumrudnaya ulitsa, 50, kv. 134, both of Moscow; Ljudmila V. Jumanova, Otdelny pereulok, 5a, kv. 13, Sverdlovsk, all of U.S.S.R.

[21] Appl. No.: 788,431

[22] Filed: Apr. 18, 1977

Related U.S. Application Data

[62] Division of Ser. No. 601,468, Aug. 4, 1975, Pat. No. 4,056,601.

[51] Int. Cl.² .............. B01J 1/00; B01J 6/00; C01B 25/01
[52] U.S. Cl. .............. 422/189; 422/200; 423/322; 13/23
[58] Field of Search .............. 423/322, 323; 23/259.2, 23/277 R, 262

[56] References Cited

U.S. PATENT DOCUMENTS

| | | | |
|---|---|---|---|
| 2,143,001 | 1/1939 | Curtis et al. | 23/262 X |
| 2,673,787 | 3/1954 | Greenawalt | 23/262 X |
| 2,924,511 | 2/1960 | Paintjes et al. | 423/322 |
| 2,967,091 | 1/1961 | Robertson | 423/322 |
| 3,163,495 | 12/1964 | Greenawalt | 23/262 X |
| 3,723,608 | 3/1973 | Meurer et al. | 423/322 |

FOREIGN PATENT DOCUMENTS

876619 7/1971 Canada .............. 423/322

*Primary Examiner*—Morris O. Wolk
*Assistant Examiner*—Arnold Turk
*Attorney, Agent, or Firm*—Fleit & Jacobson

[57] ABSTRACT

Installation for the production of yellow phosphorus comprises an electrothermal furnace and an apparatus for preliminary melting of phosphate-quartzite charge. This apparatus communicates with the bath of the electrothermal furnace via a melt collector and a liquid seal. Said apparatus and the melt collector comprise a pipe unit forming an evaporator circuit. Electrodes are arranged in the electrothermal furnace in such a manner that the first electrode in the direction of flow of melt from the collector to the furnace is located opposite to the liquid seal. A process for the production of yellow phosphorus effected in the above-described installation comprises melting phosphates with grading less than 10 mm and quartzite comminuted into flour in the apparatus for preliminary melting, concurrent defluorination of the melt by treating it in a thin layer with overheated steam obtained from moisture contained in fuel combustion products and feeding the defluorinated melt into the electrothermal furnace. At the same time, three-component lump charge containing phosphates, quartzite and a reducing agent is fed into the electrothermal furnace, and a comminuted reducing agent is also introduced under pressure into the melt layer. The reduction of yellow phosphorus is effected in the electrothermal furnace.

9 Claims, 5 Drawing Figures

INSTALLATION FOR THE PRODUCTION OF YELLOW PHOSPHORUS

The present application is a divisional of U.S. Pat. application Ser. No. 601,468, filed Aug. 4, 1975, now U.S. Pat. No. 4,056,601.

The present invention relates to the field of production of yellow phosphorus from natural phosphates with mineral quartzite-containing additives.

Known in the art is an installation for the production of yellow phosphorus. This installation comprises an electrothermal furnace having a bath with electrodes mounted therein and an apparatus for preliminary melting of phosphate-quartzite charge. The apparatus for preliminary melting of charge comprises a rotary kiln communicating, via a conduit, with the electrothermal furnace. The rotary kiln is provided with a loading device for feeding phosphate-quartzite charge and an apparatus for burning fuel. The electrothermal furnace has pipes for supplying a lump reducing agent and for discharging phosphorated gases for condensation, as well as tap-holes for discharging ferrophosphorus and slag.

However, the known installation of the above-described type is unsuitable for processing all raw materials obtained in the mines which are of normal grade as regards the contact of phosphoric anhydride $P_2O_5$ and of undergrade as regards the grading.

The rotary kiln is intended for thermal treatment of lump material only, whereas finely divided fractions cannot be efficiently processed in the kiln due to the dust losses. Dust losses are due to the formation of aerodynamic flow of fuel combustion products moving in counter-current with the flow of raw materials introduced into the kiln. The dust losses occur also in processing lump material only as a result of mechanical abrasion thereof during the movement in the rotary kiln.

Raw material is melted in the rotary kiln not instantaneously, but during a certain time period which also contributes to the dust losses of non-molten material.

The process of thermal treatment of raw materials and melt formation in the rotary kiln requires a long time. It is impossible to instantaneously melt phosphate-quartzite charge fed into the rotary kiln even at high temperatures because of a relatively thick layer of charge filling the kiln. Therefore, in order to obtain a melt of charge with minimal heat consumption, the melting process in the rotary kiln is conducted gradually. As the charge moves along the kiln and undergoes a thermal treatment with fuel combustion products, calcination and drying of the charge take place, that is decarbonization thereof. In that zone of the kiln, where the charge is free from moisture and underwent decarbonization, while the temperature of the charge attained the value required for melting, the charge starts melting and is gradually converted into melt. All the above-described processes of thermal treatment of charge require a long time.

The apparatus for preliminary melting of phosphate-quartzite charge comprising a rotary kiln is deficient in that it cannot provide for continuous feeding of melt of phosphate-quartzite charge into the electrothermal furnace under fluctuations of temperature in the rotary kiln resulting in delay in the melt formation therein. This is due to the fact that the melt is fed from the rotary kiln into the electrothermal furnace directly via a conduit. Interruptions in the supply of melt into the electrothermal furnace and overpressure in the electrothermal furnace under the pressure in the rotary kiln may result in penetration of phosphorated gases from the electrothermal furnace to the rotary kiln, and therefore, in phosphorus losses.

In addition, the use of a rotary kiln for melting of phosphate-quartzite charge results in an increased fuel consumption due to heat losses through surfaces of the rotary kiln which is of a rather large size.

The prior art installation does not possess sufficient reliability since the lined surfaces of the rotary kiln are rapdily damaged under the action of phosphorated melt.

Due to a high heat conductance of reducing agent, an extremely high temperature is observed in exhaust phosphorus sublimation products under the arch of the electrothermal furnace. This results in the need for creation of a special refractory furnace arch and employment of additional extrafurnace equipment for lowering the temperature of exhaust furnace gases prior to feeding them for condensation. This complicates the equipment facilities required for the conduct of the process.

Known in the art is a process for the production of yellow phosphorus in the above-described installation from a melt of phosphates with mineral quartzite-containing additives. By this process, phosphate-quartzite charge obtained by mixing together phosphates and quartzite is loaded into a rotary kiln and melted therein. Fuel for this kiln consists of exhaust gases from the electrothermal furnace containing carbon oxide.

Concurrently with the melting of the charge, the layers of phosphate-quartzite charge and resulting melt are treated with overheated steam obtained from moisture contained in fuel combustion products. Partially defluorinated melt is fed, via a conduit, into the electrothermal furnace below the electrodes and adajcent to the level of the maximum temperature zone of the furnace between the electrodes. At the same time, coke used as reducing agent is charged through several pipes arranged in the top portion of the electrothermal furnace. Coke is charged to a predetermined level which is sufficient for immersing the redhot coke heated between the electrodes at the whole depth of the melt of phosphate-quartzite charge in the bottom portion of the furnace. Phosphorus is reduced in the electrothermal furnace with the formation of furnace gases containing carbon oxide CO. The resulting phosphorus in the gaseous state is removed from the electrothermal furnace via a pipe for condensation. slag and ferrophosphorus formed during the reduction of the charge are discharged from the electrothermal furnace through tap-holes.

In the prior art process, the melt of phosphate-quartzite charge is fed into the electrothermal furnace between the electrodes, rather than in the high-temperature zone opposite to the electrodes. Thus, no direct thermal action on the melt fed into the electrothermal furnace on the part of the electrodes can be achieved. The results in interruptions in the melt supply to the furnace.

The application of heat to the melt by heating a reducing agent (coke, anthracite and the like) and an excessive amount thereof fed into the electrothermal furnace against stoichiometric amount result in an increased power consumption.

During the reduction of yellow phosphorus, solid carbonaceous reducing agent (coke, anthracite and the like) is fed into the electrothermal furnace in the form of lumps of different size from 5-10 mm and larger. It should be noted that large lumps of reducing agent have a small specific surface. As a result, the heterogeneous final reduction process is effected at a low rate. Furthermore, due to the presence of low-reacting lump reducing agent in the layer of melt of phosphate-quartzite charge or in the surface of the melt, the total electric conductance of the electrothermal furnace increases so that a current at an elevated voltage cannot be applied to furnace electrodes.

The above-described prior art process for the production of yellow phosphorus is deficient from the point of view of power distribution among the electrodes and distribution of reducing agent among the pipes. The reducing agent is uniformly loaded into the furnace through the pipes arranged in the furnace arch. Electric power fed to the electrothermal furnace is uniformly distributed among the electrodes extending through the furnace arch and immersed into the layer of reducing agent. Such application of electric power and reducing agent lowers the rate of reaction of phosphorus reduction and increases the content of phosphorus in the slag. This is due to the fact that the rate of reduction of phosphorus is directly proportional to the content of phosphoric anhydride in the melt of phosphate-quartzite charge, intensity of mixing of the reducing agent and melt, activity of reducing agent and shape of the bath. Therefore the zone with the maximum reduction rate requires the application of a greater amounts of electric power and reducing agent. Uniform distribution of reducing agent among the pipes and electric power among the electrodes cannot provide the compliance with this requirement.

In the prior art process, due to the loading of reducing agent down to the bottom portion of the electrothermal furnace, the losses of reducing agent during the tapping of slag and ferrophosphorus are inevitable.

In the prior art process for the production of yellow phosphorus, defluorination of phosphate by treating the melt of phosphate-quartzite charge with overheated steam in the rotary kiln is rather inefficient since it is conducted in a layer of a considerable thickness. Thus, almost all phosphorus contained in the phosphates is converted into slag during the reduction of phosphorus in the electrothermal furnace and cannot be further utilized.

It is an object of the present invention to provide an installation for the production of yellow phosphorus which permits the accomplishment of an efficient processing of all phosphate raw materials obtained in the mines, including the ores poor in phosphoric anhydride $P_2O_5$, as well as a reducing agent (coke, anthracites and the like) independently of their grading.

Another object of the invention is to simplify the construction of the installation, reduce its size and improve its reliability in operation.

Still another object of the invention is to reduce the electric power consumption for melting phosphate-quartzite charge and reducing phosphorus from the melt of such charge.

An object of the invention also consists in the intensification of the melting of phospate-quartzite charge and reduction of phosphorus from the melt of charge.

Another object of the invention is to improve the yield of phosphorus and reduce losses thereof.

Still another object of the invention is to reduce losses of reducing agent.

A further object of the invention is to increase the efficiency of defluorination of phosphates and production of fluorine.

These objects are accomplished by the provision of an installation for the production of yellow phosphorus comprising an electrothermal furnace having a bath with electrodes and an apparatus for preliminary melting of phosphate-quartzite charge communicating with the bath of the electrothermal furnace. According to the invention, the apparatus for preliminary melting of the phosphate-quartzite charge is provided with a collector, both said apparatus and collector comprising pipe units forming an evaporator circuit, and in the top portion of the apparatus there are provided burners which feed fuel therein, the burners being positioned in such a manner that a film of melt is formed which flows down along the external surfaces of the pipes, and the intertube space of the apparatus for preliminary melting of charge communicates with the bath of the electrothermal furnace via the collector and a liquid seal serving for feeding the melt from the collector into the bath of the electrothermal furnace and that of the for separating the atmospheres of the apparatus for preliminary melting of charge and electrothermal furnace, respectively.

The first electrode in the direction of flow of the melt from the collector into the bath of the electrothermal furnace is located opposite to the liquid seal, and the electrothermal furnace is provided with means for feeding a comminuted reducing agent under pressure in the melt layer.

In an installation having the electrothermal furnace of an elliptical shape with three longitudinally extending electrodes, the first electrode in the direction of flow of the melt from the collector into the electrothermal furnace preferably is of a larger diameter than the next electrodes.

This construction of the electrode provides for the application thereto of a greater power than to the remaining electrodes so as to intensify the reduction process.

The installation is preferably provided with a heat-exchange apparatus communicating with the melt collector through a gas duct.

The provision of a heat-exchange apparatus permits the utilization of the heat of combustion products formed during the combustion of gaseous fuel in the apparatus for preliminary melting of phosphate-quartzite charge to obtain steam having power utility parameters.

The above objects are also accomplished by the provision of a process for the production of yellow phosphorus in the above-described installation from a melt of phosphates with mineral quartzite-containing additives by sublimation in an electrothermal furnace in the presence of a reducing agent, wherein, according to the invention, small-sized lumps of phosphate raw material of a size not larger than 10 mm and quartzite are comminuted to a finely divided state and mixed together, the resulting two-component phosphate-quartzite charge is melted using fuel combustion products in an apparatus for preliminary melting of charge, the resulting melt flowing down along the apparatus walls is treated in a thin layer with overheated steam obtained from moisture contained in fuel combustion products with the formation of fluorine compounds which are discharged from the installation together with the combustion products, and the defluorinated melt is continuously fed into a melt collector for subsequent feeding into the bath of an electrothermal furnace, and concurrently with the above-describes steps, a three-component charge is fed to the melt surface in the electrothermal furnace which is obtained by mixing heat treated lump phosphate and quartzite raw materials with a grading from 10 to 50 mm and a reducing agent with grading about 5–25 mm, a comminuted reducing agent being also fed under pressure in the melt layer, whereby the phosphates are reduced to phosphorus in the electrothermal furnace with the formation of furnace gases containing carbon oxide, the resulting phosphorus in the gaseous state is removed together with the furnace gases for condensation, and slag and ferrophosphorus formed during the reduction of the phosphates to phosphorus are discharged from the furnace.

Weight ratio of phosphate-quartzite component of the three-component lump charge introduced into the electrothermal furnace to the comminuted phosphate-quartzite charge fed into the apparatus for preliminary melting of charge is preferably within the range 30–70:70–30%, and the weight ratio of reducing agent to phosphate in the three-component lump charge is preferably within the range 20–40:70–50%.

The above-specified ratios provide for a stable operation of the electrothermal furnace and reduction of specific electric power consumption.

The above objects are also accomplished by the provision of a process for the production of yellow phosphorus in the above-described installation from a melt of phosphates with mineral quartzite-containing additives by sublimation in an electrothermal furnace in the presence of a reducing agent, according to the invention, all phosphate raw materials with a lump size not larger than 50 mm, as well as quartzite, are comminuted to a finely divided state and mixed together, the resulting two-component phosphate-quartzite charge is melted using fuel combustion products in an apparatus for preliminary melting of charge, the resulting melt flowing down along the apparatus walls is treated in a thin layer with overheated steam obtained from moisture contained in fuel combustion products with the formation of fluorine compounds which are removed from the installation together with fuel combustion products, and the defluorinated melt is continuously fed into a melt collector for subsequent feeding it into the bath of an electrothermal furnace, comminuted reducing agent being fed under pressure in the melt layer and lump reducing agent being fed to the surface of the melt, whereby the phosphates are reduced in the electrothermal furnace with the formation of furnace gases containing carbon oxide, the resulting phosphorus in the gaseous state is removed, together with the furnace gases for condensation, and slag and ferrophosphorus formed during the reduction of phosphorus are also discharged from the furnace.

This process is preferably used in cases where fine fractions of phosphate materials prevail in the mines.

It is preferable to apply to the first electrode in the direction of flow of melt from the collector to the electrothermal furnace at least 40% of the total electric power applied to all electrodes of the electrothermal furnace, and to introduce into the melt in the zone of this electrode at least 40% of the total amount of reducing agent fed into the electrothermal furnace. This provides for the highest degree of reduction in the zone or feeding of melt into the electrothermal furnace which is the zone of the maximum rate of reduction. Thus, convective flows are formed to provide for oriented flow of the melt being reduced, the melt is intensively mixed with the reducing agent, the reduction process is accelerated, and the yield of phosphorus in the electrothermal furnace is improved.

In effecting the process in a three-electrode electrothermal furnace with longitudinally extending electrodes, the application of electric power to the first, second and third electrodes in the direction of flow of melt from the collector to the electrothermal furnace, as well as the feeding of reducing agent in the zones of these electrodes are preferably conducted in the ratio of 10:5:1.

Comminuted reducing agent is preferably introduced under pressure in the layer of melt in a mixture with an inert gas.

This permits the intensification of the reduction of phosphates to phosphorus from the melt due to an increase in the reacting interface between comminuted reducing agent and melt. The use of comminuted reducing agent in the process, according to the invention, provides for utilization in the production of phosphorus of small-sized lumps of a size not larger than 5 mm formed during the production and transportation of reducing agent.

The installation and process for the production of yellow phosphorus have a number of advantages over the prior art installation and process.

Due to the provision of an apparatus for preliminary melting of finely divided phosphate-quartzite charge with a melt collector, a single installation, according to the invention, may be used for processing of all raw material from a mine independent of the grading thereof. This is achieved due to the fact that during the melting of charge in the apparatus for preliminary melting no dust losses of finely divided charge occur because the charge is substantially instantaneously melted by virtue of the construction of this apparatus. The apparatus for preliminary melting of charge is provided with burners for burning fuel which are arranged in the top portion of the apparatus and positioned in such a manner that during the feeding of fuel and combustion products thereof and during the melting of charge, a film of melt is formed which flows down along the external surface of the pipes. Due to the melting of charge in a thin film, it is instantaneously melted, and the dust losses are insignificant or completely eliminated.

It will be apparent from the above description that the apparatus for preliminary melting of charge permits the considerable acceleration of the melting of charge as compared to the rotary kiln so that the productivity of the installation as a whole is materially improved.

The installation, according to the invention, is of a compact and reliable structure. The size of the apparatus for preliminary melting of charge is several times smaller than the side of a rotary kiln of the same capacity. The reliability of the apparatus is ensured by the provision of a pipe unit forming an evaporator circuit. Thus, the melt of phosphate-quartzite charge flowing down in a thin layer along the cold tubular surface of the apparatus forms a film which protects the external pipe surface against the damaging action of the melt.

The advantage derived from the construction of the apparatus for preliminary melting of phosphate-quartzite charge and the collector comprising pipes forming an evaporator circuit also include in the following: water flowing through the pipes is evaporated and converted into a steam-water emulsion and then into steam which may be further utilized for production purposes or for generating electric power which can be again used in the process.

Still another advantage resides in the fact that the treatment of melt of phosphate-quartzite charge in a thin layer with overheated steam obtained from moisture contained in fuel combustion products results in an intensive defluorination of phosphate raw material which permits the extradition of fluorine compounds to be further utilized as valuable product.

The installation, according to the invention, provides for reduction of power consumption for the reduction process, as well as fuel consumption for melting. Fuel consumption is lowered due to a compact structure of the apparatus for preliminary melting of charge, that is, due to low fuel losses for heating the apparatus walls. The power consumption for the reduction process is lowered due to the direct heat application to the melt of charge from the electrodes.

The process, according to the invention, permits the intensification of the process of reduction of phosphates to phosphorus from the melt of phosphate-quartzite charge. This is achieved due to the feeding of comminuted reducing agent under pressure in the melt in a mixture with an inert gas, such as nitrogen.

This feeding of reducing agent provides for uniform distribution of the reducing agent in the melt and increases the rate of the reduction process by 1.5 times as compared to the reduction process with the introduction of reducing agent in lumps.

The intensification of the reduction process is achieved due to non-uniform feeding of reducing agent and non-uniform application of electric power to the electrodes. The miximum electric power (at least 40%) is applied through the first electrode in the direction of flow of the melt from the collector to the electrothermal furnace. At least 40% of reducing agent is introduced in the zone of this electrode. Respectively lower amount of electric power is applied to the next electrodes, and smaller amount of reducing agent is introduced in the zones of these electrodes. Thus, the maximum amounts of reducing agent and electric power are applied in the zone of maximum reduction rate in the electrothermal furnace so that the maximum degree of reduction in the zone of feeding of melt in the electrothermal furnace is ensured.

In producing yellow phosphorus by the process, according to the invention, with the feeding into the electrothermal furnace of melt of phosphate-quartzite charge and lump charge, the introduction of comminuted reducing agent under pressure into the melt results in a favourable energy redistribution in the electrothermal furnace. Thus, the layer of solid charge disposed beneath the melt does not contain the most electrically conductive component. This substantially eliminates any flow of current between the electrodes and the intermediate and top zones of the furnace, the temperature of exhaust gases is reduced, and operation under a higher voltage is possible. Inert gas fed into the melt and distributed therein, as well as finely divided reducing agent result in an increased resistance of the furnace so that a higher voltage may be applied. This improves the productivity of the furnace and reduces the power consumption.

Due to the use of comminuted reducing agent diverse production rejects, such as coke and anthracite fine fractions, may be utilized.

Other objects and advantages of the invention will become apparent from the following detailed description of specific embodiments thereof with reference to the accompanying drawings, in which.

Figure 1:
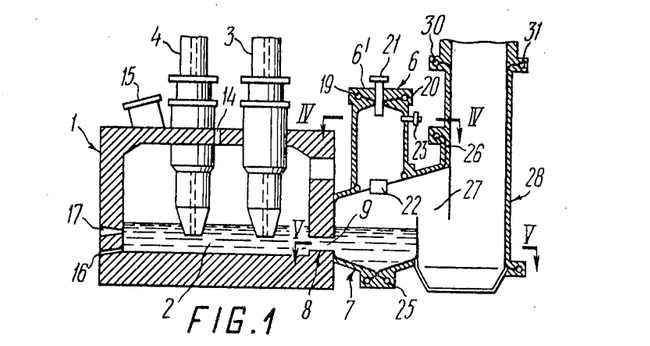
FIG. 1 shows a longitudinal section of an installation for the production of yellow phosphorus according to the invention.
Figure 2:
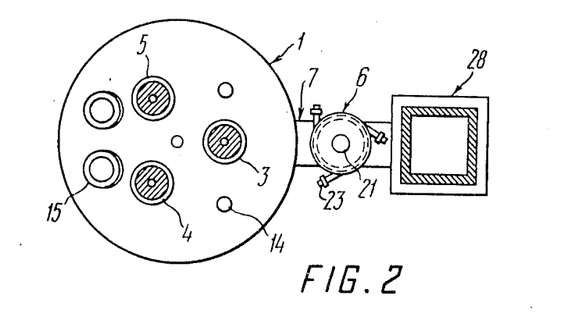
FIG. 2 shows the same installation in a plan view.

The installation for the production of yellow phosphorus comprises an electrothermal furnace 1 (FIG. 1). The electrothermal furnace 1 has a bath 2 filled with a melt of phosphate-quartzite charge. The furnace 1 is provided with hollow electrodes 3, 4, 5 (FIG. 2) extending through the furnace arch and immersed into the melt. The electrodes are made hollow for feeding therethrough comminuted reducing agent under pressure in a mixture with an inert gas. Comminuted reducing agent may also be fed under pressure through tuyeres.

The installation is also provided with an apparatus for preliminary melting of charge comprising a cyclone-type melting apparatus 6 (FIG. 1) having a melt collector 7 located in the bottom portion of the apparatus 6. The collector 7 establishes communication between the apparatus 6 and the bath 2 of the electrothermal furnace 1 through a liquid seal 8. The collector 7 and the liquid seal 8 serve for continuous feeding of melt into the bath 2 of the electrothermal furnace 1. The liquid seal 8 also separates the oxidizing atmosphere of the cyclone-type melting apparatus 6 from the reducing atmosphere of the electrothermal furnace 1 so as to eliminate oxidation and losses of phosphorus. This is achieved due to the provision of the liquid seal 8 in the form of an opening 9 n the wall of the furnace 1 below the melt level in the furnace 1 and collector 7.

The electrothermal furnace 1 (FIG. 2) is of cylindrical shape. The electrodes 3, 4, 5 are equally spaced along the circumference of the furnace 1. The electrode 3, which is the first one in the direction of flow of the melt from the collector 7 into the bath 2 is located opposite to the liquid seal 8 (FIG. 1).

Figure 3:
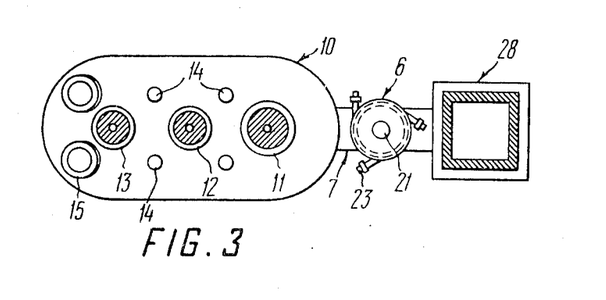
FIG. 3 shows a plan view of another embodiment of an installation for the production of yellow phosphorus according to the invention.

Differing from the furnace shown in FIG. 1, an electrothermal furnace 10 shown in FIG. 3 is of an elliptical shape and has three longitudinally extending electrodes 11, 12 and 13. The electrode 11 which is the first one in the direction of flow of the melt from the collector 7 to the furnace 10 is of a larger diameter than the other electrodes. This is necessary for application thereto of at least 40% of the total electric power applied to the three electrodes 11, 12 and 13 and for the feeding of at least 40% of the total amount of reducing agent in the zone of the electrode 11. This provides for the highest degree of phosphate to phosphorus reduction in the zone of the electrode 11 which is the zone of the maximum reduction rate.

The electrothermal furnace 1 (FIG. 1) has pipes 14 for feeding therein three-component charge, a pipe 15 for removing phosphorated gases for condensation and for discharging furnace gases, and tap-holes 16 and 17 for discharging slag and ferrophosphorus, respectively, from the furnace 1, which are formed during the reduction of the phosphates to phosphorus.

Figure 4:
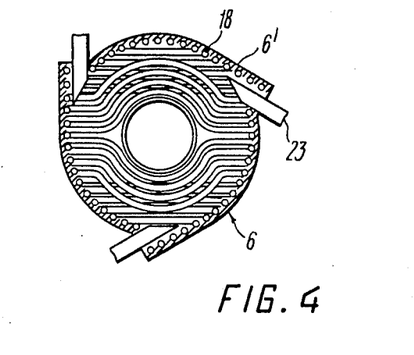
FIG. 4 is a sectional view taken along the line IV—IV in FIG. 1.

The cyclone-type apparatus 6 for preliminary melting of phosphate-quartzite charge comprises a pipe unit 18 (FIG. 4) enclosed in the housing 6' and forming an evaporator circuit, the pipes being inserted in manifolds 19 and 20 (FIG. 1). The apparatus 6 has, at the top, a pipe 21 for loading finely divided phosphate-quartzite charge and an opening 22 at the bottom for discharging the melt into the collector 7. For burning fuel and for feeding fuel combustion products, the apparatus 6 is provided with burners 23 (FIGS. 1–4) mounted in the top portion thereof and equally spaced along the periphery of the apparatus in an inclined position relative to the surface of the housing 6'.

Figure 5:
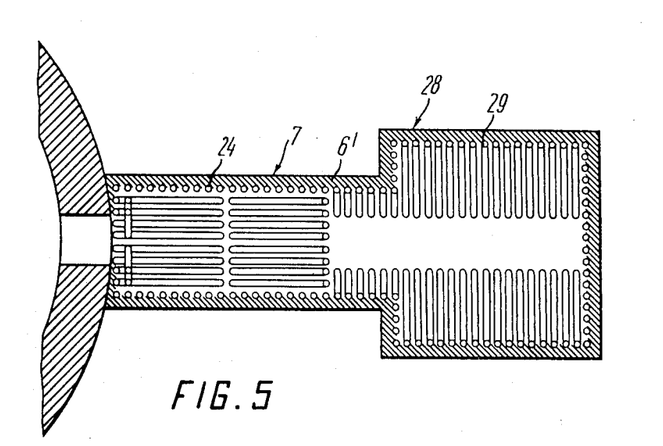
FIG. 5 is a sectional view taken along the line V—V in FIG. 1.

The melt collector 7 (FIG. 5) also comprises a pipe unit 24 enclosed in the housing 6' forming an evaporator circuit, the pipes being inserted in manifolds 25 and 26 (FIG. 1).

The melt collector 7 communicates, via a gas duct 27, with a heat-exchange apparatus 28. The heat-exchange apparatus 28 is used for utilization of heat from fuel combustion products formed upon burning gaseous fuel in the apparatus 6 to obtain utility steam which may be used, e.g. in the production of yellow phosphorus.

The heat-exchange apparatus 28 comprises a pipe unit 29 (FIG. 5) inserted in manifolds 30 and 31 (FIG. 1).

The process for the production of yellow phosphorus is carried out in the above-described installation in the following manner.

Small-sized lumps of phosphates with a grading not larger than 10 mm and quartzite are comminuted into a finely divided state and mixed together in a predetermined ratio. The resulting phosphate-quartzite charge is loaded through the pipe 21 (FIG. 1) into the cyclone-type melting apparatus 6. Concurrently, fuel fed to the apparatus 6 at a predetermined flow rate providing for a centrifugal flow is burnt in the cyclone furnace by means for the burners 23. A stream of the fuel combustion products projects the charge against the walls of the apparatus 6 to instantaneously convert the charge into melt. The resulting melt flowing down in a thin layer along the external surface of the pipes 18 (FIG. 4) of the cyclone-type apparatus 6 forms a film thereon to protect the pipes against the damaging action of melt. The melt in the thin layer in thus treated with overheated steam obtained from moisture contained in the fuel combustion products.

As a result of the hydrothermal treatment of melt in the thin layer with overheated steam, fluorine compounds are isolated from phosphates and are fed, together with the fuel combustion products, via the gas duct 27 (FIG. 1), into the heat-exchange apparatus 28 for utilization of heat and for subsequent isolation therefrom of fluorine compounds as valuable product.

Fuel is introduced into the cyclone-type apparatus 6 with an excessive amount of oxygen so as to intensify the melting process due to a temperature rise in the cyclone-type apparatus 6 and to reduce the amount of fuel combustion products. This results in a higher content of fluorine compounds in these products and, hence, in a simpler production method of fluorine extraction.

Defluorinated melt flowing down in a thin layer along the external surfaces of the pipes 18 (FIG. 4) of the apparatus 6 is fed through the opening 22 (FIG. 1) into the melt collector 7. Subsequently, the melt is admitted, via the liquid seal 8, to the bath 2 of the electrothermal furnace 1 for reduction. It should be noted that the liquid seal 8 separates the oxidizing atmosphere of the cyclone-type apparatus 6 and the melt collector 7 from the reducing atmosphere of the electrothermal furnace 1 so as to eliminate oxidation and phosphorus losses. In order to provide for reliable operation of the liquid seal 8, the first electrode 3 of the electrothermal furnace 1 in the direction of flow of the melt from the collector 7 is located opposite to the liquid seal 8. This arrangement ensures the direct action of the electrode 3 on the melt provenient from the collector 7 into the electrothermal furnace 1, and hence, continuous feeding of melt is achieved.

Concurrently with the feeding of melt from the collector 7 through the liquid seal 8 into the bath 2 of the electrothermal furnace 1, three-component charge is introduced to the surface of the melt through the pipes 14 in the arch of the furnace 1. This charge is obtained by mixing heat treated lump phosphate and quartzite raw materials with a grading from 10 to 50 mm and a reducing agent, such as coke with a grading from 5 to 25 mm. This grading of the components of the charge provides for optimal reduction conditions. It should be noted that the weight ratio of comminuted phosphate-quartzite charge fed into the cyclone-type apparatus 6 and converted into melt to the phosphate-quartzite component of the three-component charge introduced into the furnace 1 is 70–30:30–70%, and the weight ratio of coke to phosphate in the three-component lump charge is 20–:70–50%. An increase in the content of comminuted charge introduced into the furnace 1 in the form of melt above 70% results in a relative increase of the fraction of coke in the three-component lump charge. This leads to the reduction of the electric resistivity of the lump charge, and therefore, results in the formation of electrically conductive bridges between the electrodes 3, 4, 5 and between the electrodes 3, 4, 5 and the walls of the furnace 1 through the charge. Thus, the electrical performance of the furnace 1 is disturbed.

It will be apparent from the above considerations, that the above-specified ratio provides for an optimal electrical performance of the furnace 1 and for reduction of the power consumption for the reduction process. The above-specified weight ratio of coke to phosphate provides for an optimal temperature performance of the furnace. With an increase of the weight ratio of coke to phosphate up to 40–50% in the three-component lump charge, the temperature of furnace gases under the arch of the furnace 1 is lowered to 500° C. Further reduction of temperature is inexpedient so that this ratio is the optimal one.

Concurrently with the above-mentioned components, a coke comminuted into flour is introduced under pressure into the electrothermal furnace 1 in the melt layer in a mixture with an inert gas, such as nitrogen through the hollow electrodes 3, 4, and 5. This application of the reducing agent provides for an increase of the reactive surface of the finely divided reducing agent at the interface with the melt and for uniform distribution thereof in the melt, whereby the reduction process is accelerated.

Electric power and the reducing agent are fed uniformly through the hollow electrodes 3, 4, and 5.

As a result of reduction of the phosphates to yellow phosphorus from the melt of phosphate-quartzite charge in the furnace 1, gaseous phosphorus is formed, as well as furnace gases containing carbon oxide which are discharged from the furnace 1 through the pipes 15 for condensation to separate phosphorus from furnace gases. Furnace gases are fed as fuel to the fuel burners 23 of the melting apparatus 6 wherein they are burnt in a mixture with natural fuel. Slag and ferrophosphorus formed during the reduction are discharged from the furnace through the tap-holes 16 and 17.

While the process for the production of yellow phosphorus carried out in the installation having a three-electrode electrothermal furnace 10 (FIG 3) with longitudinally extending electrodes 11, 12, 13 is similar to the above-described process, it has a number of differences. Comminuted phosphate-quartzite charge obtained by mixing together quartzite and communited phosphate with a grading not larger than 50 mm (rather than up to 10 mm) is loaded into the cyclone-type apparatus 6. This is desirable where fine fractions of phosphate raw materials prevail in the mine.

The processes of melting of two-component phosphate-quartzite charge, defluorination of phosphates and feeding of the resulting melt into the electrothermal furnace 10 for reduction are conducted in the cyclone-type apparatus 6.

Concurrently with the feeding of melt, comminuted coke in a mixture with nitrogen is fed under pressure in the melt layer through the hollow electrodes 11, 12 and 13 in the furnace 10. Lump coke is fed to the surface of the melt through the pipes 14.

During the reduction in the furnace 10, electric power and coke and non-uniformly fed through the electrodes 11, 12 and 13. The electrode 11 which is the first one in the direction of flow of the melt from the cyclone-type apparatus 6 into the electrothermal furnace 10 operating in the throughput mode, is of a larger diameter as compared to the electrodes 12 and 13. Accordingly, a greater amount of electric power is applied to the electrode 11, that is at least 40% of the total power applied to the electrothermal furance 10. The distribution of electric power among the electrodes 11, 12 and 13 which are the first, second and third electrodes, respectively, in the direction of flow of the melt is effected in a ratio of 10:5:1.

The amount of reducing agent, such as coke, introduced through each hollow electrode 11, 12, 13 in the zone of each electrode in the furnace 10 is proportional to the amount of power applied to each of these electrodes.

Electric power applied to the ultimate electrode 13 for maintaining the melt temperature within a desired ranges does not exceed the amount of heat losses in this zone. The melt level in the furnace 10 remains practically unchanged.

The above-described non-uniform power and reducing agent application provides for utilization of greater amounts of power and reducing agent in the zone of maximum reduction rate adjacent to the electrode 11 which is the first one in the direction of flow of melt into the furnace 10. This arrangement provides for the highest degree of reduction in the zone of feeding of melt into the furnace 10 and for the creation of convective flows ensuring the oriented flow of the melt being reduced and an intensive mixing of the melt with the reducing agent. The above-mentioned features provide for intensification of the reduction process and improvement of the yield of phosphorus and reduction of electric power consumption.

The production of phosphorus in the above-described installation by the process according to the invention permits to the reduction of the power consumption per one ton of phosphorus by about 30–40% and improves the intensity of the reduction process by about 2 times, thereby lowering the production cost as a whole.

The invention will be better understood from the following examples illustrating the production of yellow phosphorus in the above-described installation according to the invention.

EXAMPLE 1

An installation for the production of yellow phosphorus of 5.5 ton/h capacity consisted of the cylindrical electrothermal furnace 1 (FIG. 1) with the equally spaced electrodes for a power input of 72 MVA and the cyclone-type melting apparatus 6 with the melt collector 7 of 35 ton/h capacity for charge. Phosphate containing 23% of $P_2O_5$ and 2.6% of F in a mixture with quartzite having a ratio $(SiO_2+Al_2O_3)/(CaO+Mg)=0.8$ was charged together with coke.

Three component lump charge consisting of heat treated phosphate and quartzite with a grading of 10–50 mm in an amount of 33 ton/h and coke with a grading of 5–25 mm in an amount of 6.3 ton/h were charged into the electrothermal furnace 1.

In addition, coke with a grading not larger than 5 mm was separately introduced into the electrothermal furnace 1 under pressure in the layer of melt through the hollow electrodes 3, 4, and 5 (FIG. 2) in an amount of 1.4 ton/h in a mixture with nitrogen in a weight ratio of 10:1.

Comminuted two-component charge consisting of phosphate and quartzite with a grading not larger than 1 mm was charged into the cyclone-type apparatus 6 in an amount of 35 ton/h. That is, the phosphate-quartzite fraction of the three-component lump charge introduced into the electrothermal furnace 1, and comminuted phosphate-quartzite charge introduced into the cyclone-type apparatus 6, were used in a ratio of 50:50 w.% with the weight ratio of coke to phosphate in the three-component lump charge being 22:68%.

The melting of the two-component charge and hydrothermal treatment of melt in the thin layer with overheated steam were effected in the cyclone-type apparatus 6 by using combustion products of carbonaceous gases from the electrothermal furnace which were burnt with natural fuel gas in a volumetric ratio of 2:1. Oxidizer comprised blowing air enriched with oxygen at up to 30%. The consumption of CO-gas was 1200 $nm^3/h$, natural gas with calorific value 8600 Kcal/h—6000 $nm^3/h$, blowing air —51000 $nm^3/h$ and oxygen —6700 $nm^3/h$.

Defluorinated melt flowing down from the cyclone-type apparatus 6 along the walls into the melt collector 7 was fed therefrom through the liquid seal 8 into the electrothermal furnace 1 at a temperature of 1550°–1600° C. for reduction. Fuel combustion products in an amount of 72500 $nm^3$ at 1700° C. containing about 10 $g/nm^3$ of fluorine (defluorination degree of 95%) were fed for steam generation into the heat-exchange apparatus 28, wherefrom they were fed at 1100° C. into an apparatus for heat treatment of lump phosphate comprising a slit-type shaft furnace (not shown).

After the shaft furnace, the fuel combustion products were fed at 200° C. into a system for catching fluorine compounds for further utilization thereof as valuable product, and lump phosphate was loaded into the electrothermal furnace 1 after having passed the heat treatment.

Steam was generated in the cyclone-type apparatus 6, in the melt collector 7 and heat-exchange apparatus 28 comprising pipe units 18 (FIG. 4) and pipes 24 and 29. (FIG. 5) forming evaporator circuits in which water-steam emulsion circulated. The total steam-generating capacity of the installation was 36 ton/h at a pressure of 40 kp/cm$^2$. The steam was used for production purposes in the manufacture of yellow phosphorus.

As a result of reduction of phosphate raw materials in the electrothermal furnace 1 (FIG. 1), about 22 ton/h of gaseous sublimation products were obtained containing mainly phosphorus vapours and carbon oxide, 48 ton/h of slag with a residual content of 1.2% of $P_2O_5$ and 2.2% of F, and 0.7 ton/h of ferrophosphorus. Slag and ferrophosphorus were discharged from the furnace in the form of melt through the tap-holes 16 and 17.

Phosphorated gases at 500–550° C. were fed from the electrothermal furnace 1 to condensers (not show) for removing phosphorus therefrom. After condensation, 5.5 ton/h is yellow phosphorus and 13500 nm$^3$h of exhaust gases containing up to 80% of carbon oxide were obtained. About 10% of exhaust gases were burnt in the atmosphere, and the remaining amount was fed into the cyclone-type apparatus 6 for melting two-component charge and hydrothermal treatment thereof.

Specific electric power consumption per 1 ton of yellow phosphorus thus obtained was 11300 kW.h.

EXAMPLE 2

An installation for the production of yellow phosphorus of a capacity of 6.3 ton/h consisted of the electrothermal furnace 10 (FIG. 3) of a power input of 72 MVA with longitudinally extending electrodes 11, 12, 13 and the cyclone-type apparatus 6 with the melt collector 7 of a capacity of 56 ton/h of loaded charge. Phosphate containing 23% of $P_2O_5$ and 2.6% of F was loaded in a mixture with quartzite having a ratio of $(SiO+Al_2O_3)/(CaO+MgO)=0.8$ and with coke.

Three-component lump charge consisting of heat treated phosphate and quartzite with a grading 10–50 mm in an amount of 24 ton/h and coke with a grading of 5–25 mm in an amount of 7.4 ton/h were loaded into the electrothermal furnace 10.

In addition, coke with a grading not larger than 5 mm was introduced into the electrothermal furnace 10 under pressure in the layer of melt through the hollow electrodes 11, 12, 13 in an amount of 1.4 ton/h in a mixture with nitrogen in a weight ratio of 1:10.

It should be noted that electric power was applied in the following manner: 45 MVA were applied to the electrode 11 which was the first one in the electrothermal furnace 10 in the direction of flow of the melt, and 22.5 MVA and 4.5 MVA were applied to the second and third electrodes, respectively, Coke with a grading of not larger than 5 mm was introduced through the electrodes 11, 12, 13 proportionally to the amounts of electric power applied thereto.

Comminuted two-component charge containing phosphate and quartzite with a grading not larger than 1 mm was loaded into the cyclone-type apparatus 6 in an amount of 56 ton/h. That is, the weight ratio of the phosphate-quartzite fraction of the three-component lump charge fed into the electrothermal furnace 10 to comminuted phosphate-quartzite charge loaded into the cyclone-type apparatus 6 was 30–70% with the weight ratio of coke to phosphate in the three-component lump charge being 35.4:54.6%, the distribution of electric power among the electrodes 11, 12, 13 in the direction of melt flow being effected in a ratio 10:5:1.

The melting of two-component charge and hydrothermal treatment of the melt in a thin layer with overheated steam were effected in the cyclone-type apparatus 6 with combustion products of carbonaceous gases from the electrothermal furnace 10 burnt in a mixture with natural fuel gas in a volumetric ratio of 1.5:1. Oxidizer comprised hot blowing air at 500° C. The consumption of carbonaceous gases was 14000 nm$^3$h, natural fuel gas with calorific value of 8600 Kcal/nm$^3$–2500 nm$^3$/h, and blowing air—13000 nm$^3$.

Defluorinated melt flowing down along the walls from the cyclone-type apparatus 6 into the melt collector 7 was fed therefrom through the liquid seal 8 at 1550°–1600° C. into the electrothermal furnace 10 for reduction. Fuel combustion products in an amount of 145000 nm$^3$ at 1700° C. containing about 10 g/nm$^3$ of F (defluorination degree of 95%) were fed into a boiler unit (not shown) for steam generation and for heating the blowing air.

Overheated steam (P=110 kp/cm$^2$, t=535° C.) in an amount of 1400 ton/h was fed to a turbine (not shown) for generating electric power fed in an amount of 40 MVA to the electrothermal furnace 10 to compensate for at least 50% of electric power required for reduction.

As a result of reduction of phosphorated products in the electrothermal furnace 10 about 25 ton/h gaseous sublimation products mainly containing phosphorus vapours and carbon oxide were obtained, as well as 55 ton/h of slag with a residual content of up to 1% of $P_2O_5$ and 1.3% of F, and 0.8 ton/h of ferrophosphorus. Slag and ferrophosphorus were discharged from the furnace 10 in the form of melt. Phosphorated gases at 550°–600° C. were fed from the furnace 10 to condensers (not shown) for removal of phosphorus therefrom. After condensation, 6.3 ton/h of yellow phosphorus were obtained as well as 15500 nm$^3$/h of exhaust gases containing up to 80% of carbon oxide. About 10% of exhaust gases were burnt in the atmosphere, and the remaining amount was fed into the cyclone-type apparatus 6 for melting two-component charge and for hydrothermal treatment thereof.

Specific electric power consumption per 1 ton of phosphorus produced in the installation was 10000 k.W.h.

What is claimed is:

1. An apparatus for the production of yellow phosphorus comprising:

means for preliminary melting of a phosphate-quartzite charge comprising burner means for substantially instantaneously melting the charge to form a thin flowing layer of melt, a melt collector, and means for discharging the thin flowing layer of melt into the melt collector where the thin flowing layer collects as a melt;

an electrothermal furnace adapted to hold a bath and having a plurality of electrodes mounted to extend into the bath and means for introducing a comminuted reducing agent into the electrothermal furnace;

means for providing liquid communication between the melt collector and the electrothermal furnace so the melt can flow from the melt collector to the electrothermal furnace, wherein the means for providing liquid communication defines a liquid seal between the furnace and the melt collector and wherein one of the electrodes is located opposite of the liquid seal to ensure direct action of the electrode from the collector and reliable operation of the seal.

2. The apparatus of claim 1 wherein the burner means for melting the charge to form a thin flowing layer of melt of the means for preliminary melting comprises a cyclone-type melting apparatus comprising a housing and a pipe unit enclosed in the housing forming an evaporator circuit.

3. The apparatus of claim 1 wherein the melt collector comprises a housing and a pipe unit enclosed in the housing forming an evaporator circuit.

4. The apparatus of claim 1 wherein the means for introducing a comminuted reducing agent comprise hollow portions in said electrodes.

5. The apparatus of claim 1 wherein the means for providing liquid communication between the melt collector and the electrothermal furnace comprise a common wall defining a common opening therebetween.

6. The apparatus of claim 1 wherein the electrothermal furnace is cylindrically shaped.

7. The apparatus of claim 1 wherein the electrothermal furnace is elliptically shaped, wherein the plurality of electrodes is three, and wherein the electrode located opposite to the liquid seal has a larger diameter than the other two electrodes.

8. The apparatus of claim 1 further comprising a heat exchanger and means to provide communication between the heat exchanger and the melt collector.

9. The apparatus of claim 8 wherein the means to provide communication between the heat exchanger and the melt collector is a gas duct.

* * * * *